Figure 1:
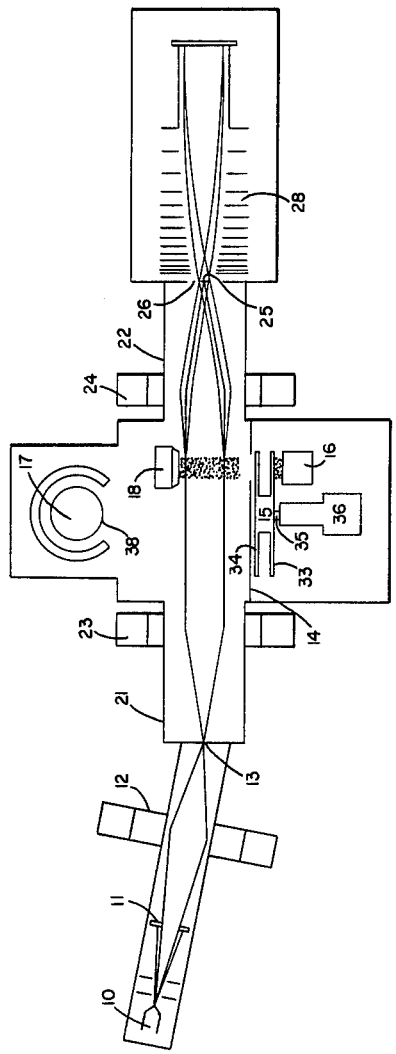

INVENTORS
STANLEY R. MIELCZAREK
DAVID C. SCHUBERT
LADISLAUS L. MARTON

Jan. 18, 1966    S. R. MIELCZAREK ETAL    3,230,366
UNIVERSAL STROBOSCOPIC ELECTRON SCHLIEREN DETECTOR
HAVING BEAM-PULSE SYNCHRONIZING MEANS
Filed Oct. 9, 1963    3 Sheets-Sheet 2

INVENTORS
STANLEY R. MIELCZAREK
DAVID C. SCHUBERT
LADISLAUS L. MARTON

BY *Melvin L. Crane* AGENT
*Richard C. Reed*
ATTORNEY

INVENTORS
STANLEY R. MIELCZAREK
DAVID C. SCHUBERT
LADISLAUS L. MARTON

BY
AGENT
ATTORNEY 3,230,366
UNIVERSAL STROBOSCOPIC ELECTRON SCHLIE-
REN DETECTOR HAVING BEAM-PULSE SYN-
CHRONIZING MEANS
Stanley R. Mielczarek, Chevy Chase, and David C.
Schubert, Silver Spring, Md., and Ladislaus L. Marton,
Washington, D.C., assignors to the United States of
America as represented by the Secretary of the Navy
Filed Oct. 9, 1963, Ser. No. 315,092
4 Claims. (Cl. 250—49.5)
(Granted under Title 35, U.S. Code (1952), sec. 266)

The invention described herein may be manufactured and used by or for the Government of the United States of America for governmental purposes without the payment of any royalties thereon or therefor.

The present invention is directed to an electron schlieren detector and more particularly to a stroboscopic electron schlieren device and a method for mapping density distributions of gases at extremely low pressures.

Low pressure gas studies are concerned with the motions of gas molecules under conditions such that the mean-free paths of molecules are significantly larger than the dimensions of the region under study. In the limit of approaching zero pressure, gas molecules or atoms behave entirely independently, moving in straight lines, except when they strike a surface where they may be absorbed or reflected and may exchange momentum and energy with the surface. Heretofore, researchers assumed that molecules were reflected from a solid surface with an angular distribution proportional to the cosine of the angle between the reflected beam and the normal to the surface and that the velocity distribution corresponded to the temperature of the reflecting surface. However, it has been determined through measurements of heat transfer to the surface that the temperature of gas molecules lay somewhere between the temperature of the incident gas atoms and that of the surface.

Heretofore different types of equipment have been used to map low-pressure gas flow. Such equipment is well known in the art as (1) the hot wire detector operable at about atmospheric pressure. (2) The optical interferometer operable at pressures greater than one torr. (3) An optical schieren device. (4) Devices that capture individual molecules or groups of molecules of which there are several types. (5) An electron bombardment detector, and many others which have advantages and disadvantages depending on their use. Such devices, as well as a discussion on the present invention, are set forth in a publication National Bureau of Standards Monograph 66, "Electron Optical Studies of Low-Pressure Gases" by L. Marton, David C. Schubert, and S. R. Mielczarek issued August 16, 1963.

The present invention is similar to, and constitutes an improvement over an electron optical schlieren device such as disclosed in an article "Apparatus for Electron Optical Study of Low-Density Gas Flow." Sixth National Symposium on Vacuum Technology Transactions, 206–209 (Pergamon Press) New York, 1960. The present system is a stroboscopic pictorial detector of free material particles in motion. This device provides a fluorescent image or a photographic image due to electron excitation in which the intensity or photographic density at each point is associated with the mean particle density at a fixed instant in a corresponding well defined region of space under study. The particles which may be observed with this device include particles which deflect electrons through small angles including but not restricted to the following: neutral atoms, neutral molecules, electrons, and ions. By comparing density distributions at different instants, the velocity distributions as well as the instantaneous spatial distributions of particles may be deduced.

An object of the present invention is to study the basic physical properties of molecular flow.

Another object is to determine velocity distributions of reflected molecules before and after impact with a solid.

Still another object is to determine heating and drag effects on an object at high altitudes or in space under simulated conditions.

Yet another object is to determine the velocity distribution of gas atoms of a molecular stream.

While another object is to provide a device by which boundary conditions on model surfaces in a wind tunnel may be determined.

Still another object is to study interactions of upper atmospheric conditions with missiles and satellites under simulated conditions.

Still another object is to provide an instrument which is easily operated and has high sensitivity, sharp focus and free of image distortion.

Figure 2:
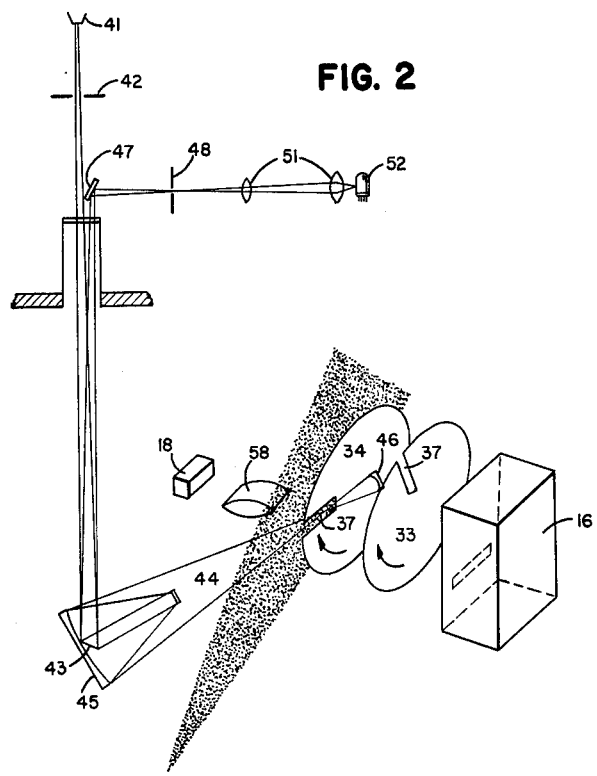
Figure 3:
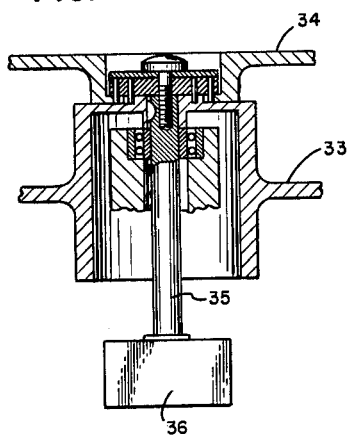
Figure 4:
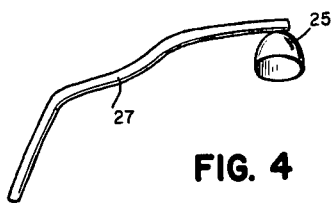
Figure 5:
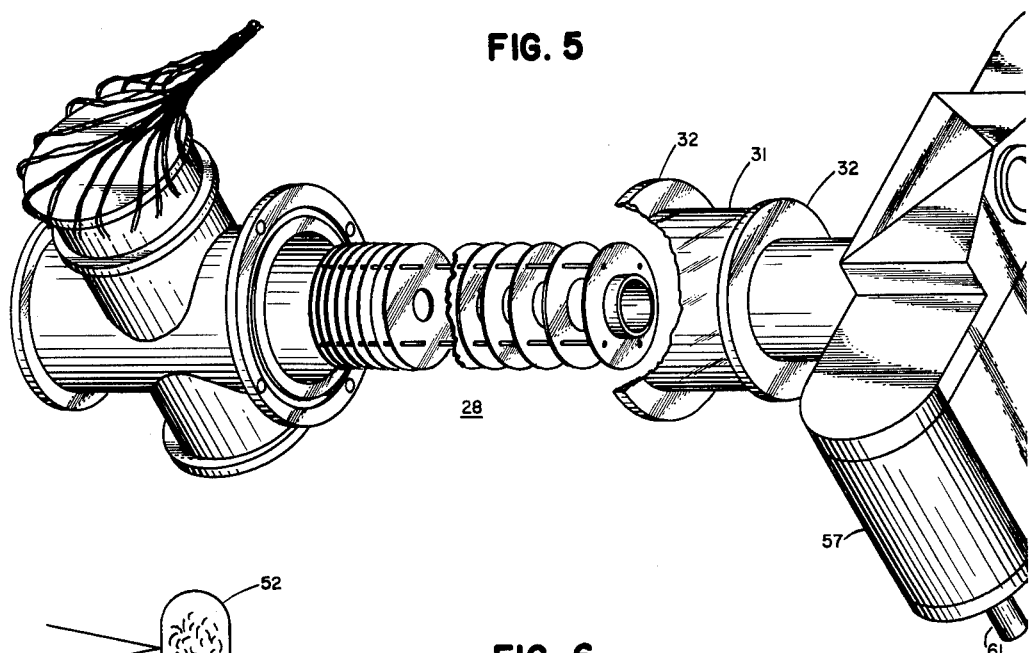
Figure 6:
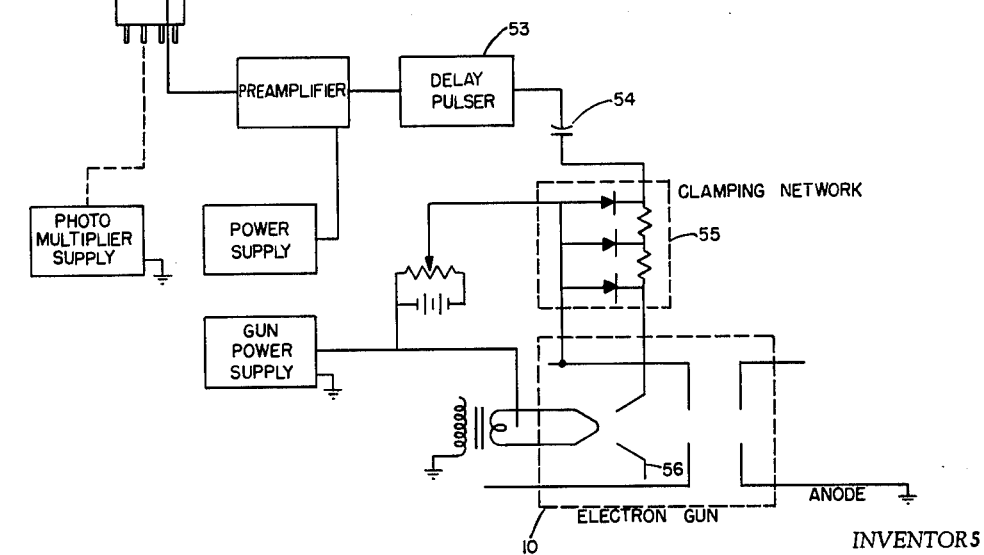

Other objects and advantages of the invention will hereinafter become more fully apparent from the following description of the annexed drawings, wherein:

FIG. 1 illustrates a schematic presentation of the present device,

FIG. 2 illustrates a section of parallel beam chopper plates with an associated optical system used to synchronize an atomic beam and an electron pulse, FIG. 3 illustrates a cross sectional view of the chopper disc and their connection to the drive shaft, FIG. 4 illustrates a view of the schlieren stop, FIG. 5 illustrates an exploded view of an electron filter accelerator; and FIG. 6 illustrates a block diagram of the synchronizing pulse circuit.

The device of this invention permits a study of low-density gas flow in a low pressure chamber by the use of controlled pulses of electrons that pass through a packet of molecules of the gas. The gas to be studied is directed through an opening which controls the velocity and direction of the beam. Electrons produced by an electron gun are directed through the packet of molecules in parallel lines. Some of the electrons strike some molecules and are scattered or knocked out of their normal path. Those that do not strike a molecule are focused onto a schlieren stop. Those electrons that are knocked from their normal path miss the schlieren stop and are focused onto a detector such as a photographic plate, fluorescent screen or some other well known detector. The electron source is controlled optically by a light beam incident on a photomultiplier tube which produces a signal to control a pulsing grid of the electron gun. The light beam is controlled by a rotating slit through which the molecules pass and an appropriate optical lens system that reflects the light beam from a light source through the rotating slit and back onto the photomultiplier tube.

Now referring to the drawing there is shown for illustrative purposes a preferred arrangement of the various elements. The device as shown in FIG. 1 has three sections, a beam generating section, a test section and a detection section in alignment with said test section. Opposite sides of the test section include a beam source and beam chopper on one side, and a beam target and vacuum pump on the other side. Each of the sections are evacuated by separate systems and have minimum openings between sections to permit the electrons and test molecules to pass through their respective sections.

The beam generating section comprises an electron gun 10, a beam limiting aperture 11, a condensing lens 12 and a condenser aperture 13. A suitable electron gun 10 is a telefocus gun of the Siemens type which provides a well-defined crossover a short distance in front of the gun. The crossover beam is focused by a condenser lens into a small spot of convergence at the entrance to the test section through the condenser aperture which is about 1 mm. in diameter. The emission of electrons by the electron gun emits visible light; therefore, the beam generating section is at a slight angle (about 1°) with the test section to prevent the emitted light from fogging the photographic film or other detector. The limiting aperture located near the electron gun serves to limit the diameter of the primary electron beam thus preventing the outermost electrons from striking the walls of the drift tube and introducing inhomogeneities in the electron beam. The condenser lens is a conventional iron-clad magnetic lens such as described by G. Liebmann and E. M. Grad, proceedings of the Royal Society (London) B64, page 1956 (1951).

The test section is made of a somewhat rectangular housing of stainless steel divided into two compartments by a septum 14 which slides into tight fitting grooves in the sides of the housing. All of the apparatus housed in these sections or compartments are secured to the top plate and lowered into the housing. One compartment includes a beam chopper 15 and an atomic beam source 16. The other compartment houses a cryogenic vacuum pump 17 and an atomic beam target 18 which is positioned in alignment with the atomic beam from the beam source. Axially aligned drift tubes or extensions 21 and 22 extend from the rectangular housing to form electron drift tubes which extend to the electron beam aperture on one side and to a schlieren stop 25 on the opposite side.

Spaced coil lenses from two principal lenses, a collimator lens 23 and an objective lens 24, surround the drift tubes in axial alignment about the linear axis of the test section and so arranged that the magnetic field produced by the coils has a stationary value of zero at the midplane of the molecular beam. The spaced coil lenses are placed about the drift tubes of the test section such that the condenser aperture of the electron beam section is located at the focal point of the first of the two principal lenses. The first lens is an electron beam collimating lens which directs the diverging electron beam into a parallel beam such that when the electron beam passes through an atomic beam pulse in the test section, the electron beam will be in parallelism, and perpendicular to the atomic beam. The second coil or objective lens is spaced from the first coil and positioned beyond the interception of the electron beam pulse and the atomic beam pulse and focuses the parallel electron beam onto the schlieren stop 25 at the end of the test section. The atomic beam must be in a reasonably field free region. Thus, the lenses are double-coiled lenses so arranged that the field has a stationary value of zero at the mid-plane of the molecular beam.

The schlieren stop 25 is positioned at the focal point of the objective electron lens and is located at the beginning of the detection section centrally located in an aperture 26 in the entrance wall to the detection section. The schlieren stop is formed as a cup about 2 mm. in diameter, made from a platinum sheet or any other conducting material and spot welded onto a heavy platinum wire 27 or any other suitable holder.

A narrow annular opening is formed by locating the schlieren stop in or near the same plane as the schlieren aperture so as to permit electrons scattered by the atomic beam to be admitted onto the detection section while stopping the unscattered electrons.

The detection section includes an electron filter-accelerator 28 and a glass cylinder 31 made of Pyrex and sealed onto brass rings 32 with an epoxy resin. A camera or other recording means is connected with the glass tube which insulates the camera from the electron filter.

It has been determined that a high photographic efficiency and a high scattering cross section are mutually contradictory requirements. Scattering cross section falls rapidly and photographic efficiency increases rapidly as the electron energy is increased. The resulting overall response of a simple electron schlieren camera is rather poor at all beams. Under typical conditions a 30-min. exposure is required for a barely satisfactory photograph of a molecular beam with density corresponding to $10^{-4}$ torr. pressure. In order to secure the advantages of both high and low beam energies, the electron filter-accelerator lens 28 of FIG. 5 is inserted in the detection section immediately following the schlieren stop. The beam energy in the scattering region may thus be kept conveniently low for high scattering cross section while energies of 10 kev. or more are employed to expose the photographic plate. Accelerating the beam from 2 kev. in the scattering region to 12 kev. at the photographic plate reduces the required exposure time from 30 min. to a few seconds. An accelerating field in the region of the schlieren stop picks up electrons which pass through the annular region in the schlieren stop, accelerates the electrons and forms an intense image of the atomic beam pulse on the photographic plate. To avoid the background effect, the accelerating field is designed with a filtering stage prior to the accelerating stage. Since most of the electrons arising at the schlieren stop are either secondaries or electrons which have transferred energy to the stop, thus are of significantly lower energy than the primary electrons scattered by the atomic beam and are removed without effecting the primary electron beam.

The electron filter accelerator comprises a series of seventeen (17) apertured copper plates supported by three glass insulating rods with the copper plates spaced one from another at exponentially increasing distance from the schlieren stop end, toward the camera end. The hole diameter in each plate increases uniformly from plate to plate toward the camera end. The first aperture plate is positioned directly in front of the schlieren stop and is maintained at ground potential while the last plate is attached to a tube extending into the electron drift space leading to the image plane and is held at the potential of the camera. By applying various potentials on each of the apertured plates, a wide variety of axial potential distributions may be produced. The electrode potentials are chosen in a manner designed to simulate an axial potential distribution with desired focusing properties. Since the electron beam is most easily disturbed in the low-voltage portion, a large number of the plates are placed near the schlieren stop end of the filter accelerator. Thus the first six plates near the schlieren stop are at low-voltage while the other plates are at an increasing high voltage to accelerate the electrons to a desired high velocity. Operation with a 2 kev. electron source requires a potential of 12 kev. on the last electrode which is at the potential of the camera in order to accelerate the primary electrons sufficiently to photograph the electrons in an exposure time of 2 or 3 seconds.

One chamber or compartment of the test section includes an atomic beam source 16 and a double-disc beam chopper 16 for controlling the atomic beam pulses that crosses the test section. The atomic beam source can be formed by any suitable method such as by any well known atomic beam oven which is properly insulated and shielded to reduce the heat emitted thereby. The beam chopper, FIG. 3, is formed by a pair of discs 33, 34 rotated by a single shaft 35 and driven by a motor 36. Each disc has one or more elongated radially extending slots 37 therein and is assembled onto the rotating shaft such that the outer disc 34 can be positioned with the slot or slots therein offset with respect to the slot or slots in the inner disc 33 in a manner such that the slot in the outer disc trails the corresponding slot in the inner disc. Different settings of the position of the slot or slots in the outer disc with respect to the corresponding slot in the inner disc enables one to select a desired velocity of the atomic beam that passes through the slots and crosses the test section.

All of the different sections must be evacuated and maintained at a low vacuum and therefore the partitions between the different sections of the device have openings only as large as necessary to pass the atomic beam from the chopper-oven compartment to the test section and to pass the electron beam from the beam generating section to the detector section. The success of the device depends critically upon the ability to maintain a lower density of background gas molecules than the density of chopped-beam molecules that pass across the test section. Conventional vacuum pump techniques can be used to provide the necessary vacuum of about $10^{-6}$ torr. in all sections except the test section which requires a lower vacuum of about $10^{-8}$ torr. to about $10^{-10}$ torr. Thus, the test section is provided with a cryogenic trap 38 upon which all the heavy gases are condensed and frozen onto the cold surfaces.

Due to the chopper, the molecular beam enters the test section in regulated timed pulses; therefore, the electron beam is generated in pulses relative to the molecular beam pulse. The electron beam pulses are timed with respect to the corresponding atomic beam pulses so that each electron pulse "sees" the atomic pulse in the same position. Therefore, a synchronizing electrical signal for this purpose is obtained through an appropriate optical system that feeds a light beam into a photomultiplier tube or any other light sensitive element that produces an electrical pulse due to light incidence. The photomultiplier tube then produces an electrical signal that triggers a pulse generator which in turn pulses the electron gun to produce an electron beam at the proper time. The light beam first passes through the same chopper slit of the outer disc that transmits the atomic beam so the time accuracy is independent of vibrations of the chopper disc and any errors in the spacing of the slits in the chopper.

A system used for the timing sequence is shown by illustration in FIG. 2. As shown, a continuous light beam is emitted by light source 41 through an aperture 42 onto a plane mirror 43 set at an angle thereto which reflects the light onto a convex mirror 44. The convex mirror reflects the light onto a large concave mirror 45 which focuses the light through the slit 37 in the outer disc 34 of the beam chopper. A concave mirror 46 is positioned between the two discs on the chopper and held stationary by any suitable means such that the concave mirror 46 reflects the light beam back through the slit in the outer disc of the beam chopper onto the large concave mirror 45 which reflects the light back onto convex mirror 44. The convex mirror 44 reflects the light back onto the plane mirror 43 which reflects the light onto a plane mirror 47, plane mirror 47 is positioned at an angle with respect to the light beam such that the light beam is then reflected through an exit slit 48 through suitable optical lenses 51 that focus the light onto the photocathode of a photomultiplier tube 52 for example, a 931A photomultiplier tube.

The electron gun is normally biased below cutoff and is only operated when desired by an output signal from the photomultiplier tube through suitable electrical circuitry to a pulse generator. A block diagram of the electron beam control circuit is shown in FIG. 6. As shown, the light beam is incident on the photomultiplier tube 52 which has the output connected to a delay pulser 53 which is controlled by an operator for a 10 to 100 microsecond delay. The delay pulser is coupled by a high-voltage capacitor 54 to a diode clamping circuit 55 which controls the base voltage of the cutoff pulse through grid 56. With the electron gun 10 biased below cutoff, there are no electrons anywhere in the optical system and residual effects do not occur. The output pulse of the photomultiplier on grid 56 is sufficient to permit an electron emission by the electron gun.

There are several methods with which one can detect electron beams. The simplest and most reliable method is to use photographic plates. The plates provide a compact permanent record, which may be analyzed in whatever detail seems initially suitable without jeopardizing the possibility of more detailed analysis, if desired, at a later time. Thus, photographic plates are used with the present device to record the electron optical images. In order to remove the photographic plates from the camera 57 as required, a valve is provided in the camera which is closed to preserve the vacuum in the device during removal and replacement of the photographic plates. The camera is also provided with a bypass valve which enables one to evacuate the camera before it is returned to operating condition and the valve opened to the vacuum system of the device. Thus the evacuation of the apparatus is not disturbed by removal and replacement of the photographic plates.

Since the beam of electrons that expose the photographic plates must be accurately controlled, the instrument must be protected against the influence of the earth's magnetic field on the electron beam. Therefore, four rectangular coils are used and placed in parallel horizontal and vertical planes on opposite sides of the apparatus. The coils take the form of elongated Helmholtz coils which are suitable for the accuracy required by the apparatus. The coils are not shown for simplification of the drawings.

In operation, the apparatus is evacuated and baked out by use of any suitable well known equipment. The camera is loaded, evacuated, and opened to the evacuated system of the apparatus with the photographic plates ready to be positioned into place. The electrical equipment is turned on and made ready as well as the atomic beam source and the light source for the optical control of the photomultiplier tube which pulses the electron gun. The atomic beam is permitted to pass through a small opening toward the chopper wheel which is in an evacuated chamber. Most of the atomic particles travel in a straight line and are stopped by the beam chopper. The beam chopper is rotated and as the slit in the inner disc crosses or passes through the atomic beam, those molecules which are in alignment with the slit pass through the slit. The slit in the outer disc trails the slit in the inner disc so that a short time elapses between the open time of the inner and outer slits; therefore, the only molecules transmitted through the outer disc are those molecules whose velocity is just right to traverse the distance between the two discs in the delay time between the time the two slots pass through the beam. The ribbon shaped beam is thus reduced to a series of chopped segments or packets 58 which travel across the vacuum test chamber at a controlled velocity. After passing through the test area, the molecules strike a target and are collected thereby. As the beam chopper is rotated, a light beam from the light source is focused through the slit in the outer disc, when the slit passes across the beam, onto the concave spherical mirror 46 which reflects the light back onto the photocathode of a photomultiplier tube. The photomultiplier tube then produces a signal which is amplified, delayed by a manual control for a specific period to permit the atomic molecules to cross into the test path and then is transmitted to a pulse generator which pulses a pulsing grid that controls the electron gun output. The grid is pulsed for only one microsecond to produce a one microsecond electron beam pulse. The electron beam is then directed through the apparatus and passes through the atomic beam normal thereto. A small fraction of the electrons passing through the molecular beam segment collide with gas molecules and are consequently scattered. The scattering angle is usually small, less than one degree.

The objective lens positioned around the test chamber electron drift tube brings the unscattered electrons to a point focus at the schlieren stop which captures and adsorbs the unscattered electrons. The scattered electrons miss the point focus and are not incident onto the schlieren stop. Those electrons that have been scattered through too large an angle are captured by a metal diaphragm with a circular aperture that surrounds the schlieren stop (in which the aperture is just larger than the schlieren stop) positioned in the plane of the stop. Those electrons which are scattered over an angle which is too large to be captured by the schlieren stop and yet not large enough to be captured by the metal diaphragm pass by the schlieren stop and the aperture in the metal diaphragm. The electrons that pass through the aperture at the schlieren stop are accelerated through the filter accelerator and are focused onto the photographic plate that has been positioned in place in the camera. The decelerating field between the schlieren stop and the accelerating field screens out any secondary electrons or reflected electrons that accidentally get past the schlieren stop.

The focusing of the electron lenses is adjusted so that all electrons scattered from a given point, in the midplane of the molecular beam segment, come together at a common point in the image plane. In the present apparatus, the number of electrons reaching the image plane of the camera from a single pulse is insufficient to expose the photographic plate. Consequently the plate is repeatedly exposed by successive pulses in the same stage of travel. The insurance that each pulse is in the same state of travel is dictated by the use of the accurate synchronizing light signal and an unchanging time delay in the pulse generator. If the exploring electron beam is limited to pulses of from 1 to 3 microseconds, the atomic beam travel during the pulse is less than one millimeter, and succeeding electron beam pulses are timed with respect to the corresponding atomic beam pulses so that each electron beam pulse "sees" the atomic beam pulse in the same position.

The above operation has been described for an apparatus wherein the electron beam pulses pass through an atomic beam. The apparatus will operate in the same manner where one wants to study the effects of molecules hitting a surface. Then the electron beam pulse is directed through the particles that are reflected by, emitted from, or scattered by the surface struck by the atomic or molecular source. Thus the teaching of the present invention can be applied to different ways of operation to obtain the end result of a photographic presentation.

Obviously many modifications and variations of the present invention are possible in the light of the above teachings. It is therefore to be understood that within the scope of the appended claims the invention may be practiced otherwise than as specifically described.

What is claimed is:

1. A stroboscopic mechanism for synchronizing an electron beam pulse with a pulse of atoms in an electron optical schlieren detector apparatus which comprises:
   (a) an electron beam producing means normally biased off,
   (b) a source of atoms for producing a continuous beam of atoms,
   (c) a rotatable beam chopper that intercepts said beam of atoms,
   (d) said chopper comprising first and second axially spaced discs with said first disc facing said continuous beam of atoms normal thereto,
   (e) radial slots in each of said discs with the slot in said first disc arranged to pass through said beam of atoms prior to the slot in said second disc,
   (f) said slots in said discs permitting a beam pulse of atoms of specific velocity to pass through said radial slot in said second disc in timed sequence,
   (g) a light source for producing a beam of light,
   (h) reflecting surfaces for reflecting said beam of light onto a light sensitive element for producing an electrical signal due to said light beam,
   (i) said second disc modulating said light beam to permit light pulses to be reflected onto said light sensitive element,
   (j) said light sensitive element producing electrical signals due to said incident light pulses,
   (k) said electrical signals being directed to said electron beam producing means to bias said electron producing means "on" to produce electron beam pulses of a specific time duration,
   (l) whereby said electron beam pulses are directed through said beam pulses of atoms for a specific time and are subsequently detected by a detector.

2. A stroboscopic system for synchronizing an electron beam pulse with a pulse of atoms in an electron optical schlieren detector apparatus which comprises:
   (a) a rotatable chopper which intercepts a continuous beam of atoms,
   (b) said rotatable chopper comprising first and second axially spaced discs with said first disc facing said continuous beam of atoms,
   (c) a radial slot in each of said first and second discs with said slot in said first disc adapted to pass through said continuous beam of atoms at right angles thereto prior to said slot in said second disc passing therethrough,
   (d) a light reflector positioned between said disc and out of the path of said beams of atoms that pass through said slots,
   (e) a light source for producing a beam of light,
   (f) an optical light reflecting system for reflecting incident light from said light source onto said second disc and through the radial slot in said second disc as said slot passes through said light beam, onto said light reflector positioned between said chopped discs,
   (g) said reflective surface between said discs reflecting said incident light back through said radial slot in said second disc onto said optical reflecting system,
   (h) said optical reflecting system reflecting said light from said reflective surface positioned between said first and second disc through an optical focusing lens system onto a light sensitive element that produces an electrical signal due to said light incident thereon,
   (i) an electron beam producing means,
   (j) said electrical signal being directed to said electron beam producing means to permit said electron beam producing means to emit an electron beam pulse,
   (k) whereby said electron beam pulse is directed through said pulse of atoms that pass through said radial slots in said chopper and are subsequently detected by a detector.

3. A stroboscopic control system for an electron schlieren detector which comprises:
   (a) a housing
   (b) means for evacuating said housing,
   (c) means for producing an electron beam pulse,
   (d) means for producing a continuous beam of atoms perpendicular to said electron beam pulse,
   (e) a rotatable beam chopper positioned to pass through said continuous beam of atoms normal thereto to produce packets of atoms,
   (f) said chopper comprising first and second axially spaced discs,
   (g) said first disc being located closer to said beam producing means than said second disc,
   (h) a radial slot in each of said discs,
   (i) said slot in said first disc positioned relative to said slot in said second disc to pass through said beam of atoms ahead of the radial slot in said second disc whereby only certain velocity atoms pass through both slots in said rotatable beam chopper,
   (j) a light source for producing a light beam,
   (k) a light reflecting optical system for reflecting said light beam through said radial slot in said second disc and back through the same radial slot as said beam chopper is rotated,
   (l) a light sensitive element positioned to receive said light beam reflected back through said radial slot,
   (m) said light sensitive element producing an electrical pulse in response to said incident light beam,
   (n) said electrical pulse being directed to said electron beam pulse producing means to trigger said electron beam pulse producing means,
(o) said electron beam pulse being directed through said packet of atoms whereby some electrons in the beam are scattered by atoms in said packet,
(p) a schlieren stop means for stopping any unscattered electrons
(q) and means for detecting those electrons scattered by said atoms in said packet.

4. A stroboscopic electron schlieren detector which comprises:
(a) an evacuated housing
(b) an electron gun located in one end of said housing,
(c) a biasing grid positioned relative to said electron gun for controlling emission of electrons by said electron gun,
(d) electron control means positioned relative to said electron gun for focusing electrons emitted by said electron gun into a test section of said housing
(e) said test section including a mid-chamber with opposing extensions,
(f) a source of molecules of gas for producing a continuous beam of gas molecules directed toward said mid-chamber of said test section normal to an axis through said opposing extensions of said test section,
(g) a rotatable beam chopper positioned to pass through said continuous beam of gas molecules normal thereto to produce periodic packets of gas molecules within said test chamber,
(h) said beam chopper comprising first and second axially spaced discs with said first disc being located closest to said source of gas molecules,
(i) a radial slot in each of said discs,
(j) said radial slot in said first disc being positioned relative to said slot in said second disc to pass through said beam of gas molecules ahead of the radial slot in said second disc,
(k) said slots in said discs permitting gas molecule packets of a desired velocity to pass therethrough into said test section depending on the relative positions of said slots in said discs,
(l) a light source for producing a light beam,
(m) a light reflecting optical system for reflecting said light onto said second disc and through said radial slot in said second disc and back through said radial slot as said beam chopper is rotated through the beam of gas molecules and said light beam,
(n) a photomultiplier tube positioned to receive said light beam reflected back through said radial slot on said second disc to produce an electrical signal due to said received light beam,
(o) electrical circuit means associated with said photomultiplier tube to feed said electrical signal to said biasing grid positioned relative to said electron gun,
(p) said electrical signal permitting an electron beam pulse to be emitted by said electron gun and directed into said test section by said electron control means,
(q) an electrical lens positioned around one of said test section extensions to collimate said electron beam, and to direct said electron beam through said packet of gas molecules normal thereto,
(r) an objective lens positioned around the other of said test section extensions to focus said electron beam subsequent to passing through said beam of gas molecules,
(s) a schlieren stop positioned at the focus of said objective lens,
(t) said schlieren stop, stopping those electrons that pass through said beam of gas molecules without striking any molecules, and focused by said objective lens,
(u) an annular opening around said schlieren stop,
(v) said objective lens focusing those electrons scattered by collisions with said gas molecules through said annular opening around said schlieren stop, and
(w) an electron detection section positioned relative to said schlieren stop to direct those electrons focused through said annular opening around said schlieren stop to a detector,
(x) said detector detecting those electrons incident thereon.

References Cited by the Examiner
UNITED STATES PATENTS 3,101,414   8/1963   Grabowsky _____ 250—218

OTHER REFERENCES

"Apparatus For Electron Optical Study of Low-Density Gas Flow," by S. R. Mielczarek, D. C. Schubert, and L. Marton, from Sixth National Symposium on Vacuum Technology Transactions, pages 206–209 (Pergamon Press), New York, 1960. QC 166 N 3.

RALPH G. NILSON, *Primary Examiner.*

A. L. BIRCH, *Assistant Examiner.*